3,474,110
PROCESS OF ALKYLATING CYCLIC
ANHYDRIDES
Ashot Merijan, Rahway, and Frederick Grosser, Midland Park, N.J., assignors to GAF Corporation, a corporation of Delaware
No Drawing. Filed Oct. 9, 1964, Ser. No. 402,933
Int. Cl. C07d 5/04, 7/00, 15/14
U.S. Cl. 260—340.2   10 Claims

ABSTRACT OF THE DISCLOSURE

Succinic, glutaric and diglycollic anhydride are alkylated by heating 1 mole of said anhydride with 0.01 to 10 moles of an α-olefin such as chloro-fluoro-α-olefin and fluoro-α-olefin of 2 carbon atoms and an α-olefin of from 2 to 100 carbon atoms at a temperature of from 100°–200° C. in the presence of about 0.02 to about 0.3 mole of an organic peroxide per mole of said α-olefin. The position at which alkylation occurs in said anhydrides is primarily in the alpha position to the carbonyl. A new and useful class of 3-alkyl diglycollic anhydrides is provided by said process.

This invention relates to a process of alkylating 5- and 6-membered cyclic anhydrides and to the products resulting therefrom.

In a broad aspect, the present invention is directed to a process for alkylating 5- and 6-membered cyclic anhydrides with α-olefins in the presence of an organic peroxide as an alkylation initiator to produce a large variety of useful alkylated products which may be employed as such or in organic syntheses to yield still another class of useful products.

Accordingly, one or more of the following objects will be achieved by the practice of this invention.

It is an object of this invention to provide a process for alkylating 5- and 6-membered cyclic anhydrides having useful applications.

Other objects and advantages will become apparent from the following description.

The foregoing objects are attained by the addition of an α-olefin of at least 2 carbon atoms to a 5- and 6-membered cyclic anhydride while employing an organic peroxide as the initiator. The addition (alkylation) is readily accomplished by heating a mixture consisting of 0.01 to 10 moles of an α-olefin of at least 2 carbon atoms and one mole of a 5- or 6-membered cyclic anhydride in the presence of about 0.02 to about 0.3 mole of an organic peroxide per mole of an α-olefin at a temperature of 100–200° C. for a period of time ranging from 3 to 60 hours.

The alkylation reaction may also be conducted in solution of an inert organic solvent common to the cyclic anhydride and α-olefin. As solvents we found that 1,4-dioxane; n-butyl ether, dimethyl ether of diethylene glycol, etc. are very effective. It is to be noted that the nature or character of the inert organic solvent is immaterial so long as it forms a fluid solution at the reaction temperature with the cyclic anhydride and is less susceptible to alkylation than the anhydride.

The amount of inert organic solvent employed is not critical. Any amount which will yield a solution of the cyclic anhydride and α-olefin will suffice. For purposes of expediency we find that for every part by weight of cyclic anhydride from 2 to 10 parts of inert organic solvent, either by volume or by weight, are sufficient to yield a workable solution within the aforementioned temperature range.

As a peroxide catalyst (initiator) for the alkylation reaction we can employ any one of the known organic peroxides normally employed as initiators in chemical reactions such as, for example, t-butyl-perbenzoate, t-butyl hydroperoxide, t-butyl perphthalic acid, p-chlorobenzoyl perodixe, t-butyl peracetate, di-t-butyl peroxide, di-t-amyl peroxide, bis(triethylmethyl) peroxide, t-butyl-pentamethyl ethyl peroxide, 2,5-dimethyl-2,5-di(t-butyl peroxy)-hexane, 2,5-dimethylhexyl-2,5-dihydroperoxide, 2,5-dimethylhexyl-2,5-di(peroxy benzoate), etc. Where low-boiling α-olefins of from 2 to 6 carbon atoms and the fluoro-α-olefins and chloro-fluoro-α-olefins are employed as the alkylating agents pressure equipment must be used. In such case the organic peroxide catalyst, preferably di-t-butyl peroxide, and the cyclic anhydride are added into a stainless steel rocker bomb. The low-boiling α-olefin or fluoro-α-olefin or chloro-fluoro-α-olefin is then charged to the bomb and the bomb heated and maintained at a temperature of from 120° to 145° C. for a period of time ranging from 5 to 16 hours. The pressure developed in the bomb may range from 100–1,000 p.s.i. After cooling to room temperature the contents of the bomb are discharged into any suitable vacuum distillation equipment to remove the solvent and the residual product recovered as a solid or a viscous fluid and, if desired, recrystallized from a low boiling hydrocarbon or petroleum ether.

The 5- and 6-membered cyclic anhydrides which are alkylated with an -olefin in accordance with the present invention are characterized by the following formula:

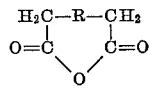

wherein R represents either a single bond joining the two methylene (—CH$_2$—) groups, an oxy or methylene group.

As examples of such cyclic anhydrides the following are illustrative: succinic anhydride, glutaric anhydride and diglycollic anhydride (2,6-diketodioxane).

Any α-olefin having from 2 to 100 carbon atoms, i.e., a molecular weight from about 28 to as high as 2,500 may be employed in the alkylation of the 5- and 6-membered cyclic anhydrides. In other words, α-olefins ranging from ethene (ethylene) to as high as polybutenes having molecular weights from 400 to 2,500 may be employed. As examples of such α-olefins the following are illustrative:

Ethene, propene, 1-butene, 1-pentene, 2-ethyl-1-butene, 2-methyl-1-pentene, 1-hexene, 5-methyl-1-hexene, 2-methyl-1-pentene, 3-ethyl-1-pentene, 1-heptene, 1-octene, 1-nonene, 2-ethyl-1-hexene, 1-decene, 1-dodecene, 1-tetradecene, 1-hexadecene, 1-heptadecene, 1-octadecene, 1-nonadecene, 1-eicosene, 1-docosene, 1-tetracosene, 1-pentacosene, polybutenes of molecular weight of 400 to 2,500.

Instead of employing any one of the foregoing individual α-olefins, a mixture of commercially available linear α-olefins produced by cracking petroleum wax or by polymerizing lower olefins may also be used as the alkylating agent. The commercial product composition contains a mixture of linear olefins. Such mixture may contain linear olefins ranging from 6 to 8 carbon atoms, 8 to 12 carbon atoms, 10 to 12 carbon atoms, 12 to 16 carbon atoms, 16 to 20 carbon atoms and as high as 20 to 42 carbon atoms. For example, the product composition of linear heptene having 92% of mono-olefins, contains 89% of α-heptene, 6% of α-hexene and 5% of α-octene based on the mono-olefin basis. By careful distillation of the commercial product composition substantially individual α-olefins are obtained which may be used as the alkylating agent.

While linear α-olefins are preferred because of their commercial availability, we have found that the numerous isomers of α-olefins ranging from 1-pentene to 1-pentacosene as well as polybutenes may also be employed in the alkylation reaction. The only precaution required in such case is that the isomer contain an ethylenic unsaturation in the α-position thereof.

Instead of employing ethylene (ethene) as the alkylating agent, fluoro-α-olefins and chloro-fluoro-α-olefins such as for example dichlorovinylidene fluoride ($CCl_2=CF_2$), chlorovinylidence fluoride ($CHCl=CF_2$), chlorotrifluoroethylene ($CClF=CF_2$), tetrofluoroethylene ($CF_2=CF_2$), and vinylidene fluoride ($CH_2=CF_2$) may be used.

By the proper choice of alkylating agent, i.e., α-olefin, and the degree of alkylation, it is possible to obtain alkylated products which are soluble in polar solvents, such as alcohols or which are soluble in aliphatic hydrocarbons of from 6 to 60 carbon atoms including isomers thereof, mineral and lubricating oils having a Saybolt viscosity of from 50 to 200 seconds.

The position at which alkylation occurs in the 5- and 6-membered cyclic anhydrides is primarily in the alpha (to carbonyl) position.

In the alkylation of the 5- and 6-membered cyclic anhydrides with α-olefins, more than one mole of the latter can react with each mole of the anhydride. For example with an α-olefin of $C_{15-20}$ using one to three moles in excess of the cyclic anhydride, the adduct (alkylate) would constitute the entire product. Multiple alkylation is usually the case if the cyclic anhydrides are not used in excess.

EXAMPLE I

Into a 500 ml., four-necked flask equipped with stirrer, thermometer, nitrogen inlet and reflux condenser, after a thorough nitrogen purge, the following ingredients were charged:

Succinic anhydride—250.0 grams (2.5 moles).
1-decene—70.0 grams (0.5 mole).

The mixture was heated, and at 130° C. when all the succinic anhydride had melted (two distinct layers), 10 grams of di-t-butyl peroxide were added and the agitation rate increased. The contents were maintained at 130–140° C. for 18 hours and then an additional 10 grams of the peroxide added (total=20 grams, 0.137 mole) and the reaction conditions maintained for 4 more hours (total=22 hrs.). The contents, while warm, were then poured into a 1,500 ml. beaker containing 500 mls. of heptane, stirred and filtered. The filter cake was reslurried twice more in boiling heptane and filtered. The filtrates were combined and cooled in ice water. A white crystalline mass was obtained which was separated and recrystallized from petroleum ether and dried in vacuum oven at 60° C. The dried product weighed 45 grams and had a melting point of 64–67° C. and analyzed for 3-decyl succinic anhydride as follows:

Carbon: found, 69.47; calcd., 69.96.
Hydrogen: found, 9.97; calcd., 10.06.
Acid number: found, 487; calcd., 467.

EXAMPLE II

Into a one-liter stainless steel shaker bomb the following ingredients were charged:

Succinic anhydride—300.0 grams (3.0 moles).
1,4-dioxane—300 mls.
1-dodecene—72.2 grams (0.43 mole).
t-Butyl perbenzoate—16.7 grams (0.086 mole).

The bomb was then purged with nitrogen, sealed and heated with shaking. The bomb was maintained at 130–145° C. for 16 hours. The contents after cooling were a liquid solid mixture. They were discharged into a 2-liter beaker, 400 mls. of petroleum ether added and the mixture boiled on the steam bath for five minutes and then filtered. The filtrate was vacuum stripped and all the volatiles boiling up to 100° C. at 25 mm. of mercury pressure were removed. The residue after cooling was transferred into a 600 ml. beaker, 200 mls. of petroleum ether added, boiled and filtered. The filtrate was cooled in ice-water and a mass of waxy crystals obtained. The crystals were separated by filtration, recrystallized again from petroleum ether and then dried in vacuum oven. The dried product weighed 50 grams corresponding to a yield of 43.5% based on the 1-dodecene. It analyzed for 3-dodecyl succinic anhydride as follows:

Molecular weight: found, 262; calcd., 268.
Acid number: found, 425; calcd., 418.

EXAMPLE III

Into a 1,000-ml. four-necked flask equipped with stirrer, thermometer, nitrogen inlet and reflux condenser the following ingredients were charged:

Glutaric acid anhydride—456 grams (4.0 moles).
Alpha hexadecene—112 grams (0.5 mole).
Xylol—100 mls.
Di-t-amyl peroxide—13.0 grams (0.075 mole).

The flask was then purged with nitrogen, heated and maintained at 125–145° C. with high speed agitation. After twelve hours another 4.4 grams of the peroxide were added (17.4 grams total or 0.1 mole) and the reaction continued for twelve more hours. At the conclusion of the 24-hour period, a sample was withdrawn (while hot and agitating) and analyzed. It was found to contain 2.38% by weight residual alpha-hexadecene corresponding to 16 grams only (i.e. 96 grams of the olefin reacted). The contents were then subjected to vacuum distillation and all the volatiles removed. (Final stripping conditions were 180° C. pot temperature at 2.0 mm. mercury pressure.) After cooling the residue and disconnecting the reflux condenser, 300 mls. of petroleum ether was added, heated to reflux with agitation and filtered. The filtrate was cooled in ice-water bath for several hours. A waxy solid was obtained which was recrystallized twice from petroleum ether and finally dried in vacuum oven at 40–50° C. The waxy product weighed 61 grams and analyzed for 3-hexadecyl glutaric anhydride as follows:

Acid number: found, 320; calcd., 332.
Carbon: found, 74.80; calcd., 74.54%.
Hydrogen: found, 11.00; calcd., 11.31%.

EXAMPLE IV

Apparatus: the same as described in Example III.

Following a nitrogen purge of the system, the following ingredients were charged. (Nitrogen pressure was maintained throughout.)

Diglycolic acid anhydride—348.0 grams (3.0 moles).
1-decene—84.0 grams (0.6 mole).
2,5 - dimethyl - 2,5 - di(t-butyl peroxy) hexane—14.5 grams (0.05 mole).

The contents were heated and maintained at 140–160° C. for 20 hours. Then, 400 mls. of heptane was added and the mixture refluxed for one hour. After cooling the contents to 60–70° C. (liquid-solid mixture), it was filtered by suction and the cake reslurried in 400 mls. of warm heptane and filtered again. The filtrates were combined and the volume reduced by one-half. The concentrated heptane solution was then cooled in an ice-water bath for several hours. A white waxy solid mass precipitated out. The solid mass was separated by filtration and transferred into a one-liter beaker. Then, 500 mls. of petroleum ether was added and the mixture boiled till most of the solid dissolved and then filtered while hot. The filtrate was cooled in an ice-water bath again. The resulting white crystalline product was separated and dried in vacuum oven at 40–60° C. The dried product weighed 84.5 grams and melted at 48–50° C. After recrystallizing twice more from petroleum ether it was analyzed for 3-decyl diglycollic acid anhydride with the following results:

Percent carbon: found, 65.42; calcd., 65.59.
Percent hydrogen: found, 9.70; calcd., 9.43.
Molecular weight: found, 260; calcd., 256.3.

The alkylated cyclic anhydrides prepared in accordance with the present invention are useful as intermediates in the preparation of a variety of new and useful compounds, such as half esters, neutral full esters, and other products which can be expected from an anhydride system. By the reaction with ammonia in the usual manner they yield the corresponding imides.

The resulting alkylated cyclic imides undergo vinylation by first forming the potassium salt by mixing the imide with about 2% by weight of powdered caustic potash distilling off the water followed by vinylation at about 15 atmospheres of pressure with a mixture of acetylene and nitrogen in the conventional manner. The resulting monomers polymerize by the conventional solution polymerization to yield homopolymers having solubility in a wide range of polar and non-polar solvents. The solubility can be systematically controlled during the alkylation reaction, both by the type of α-olefin used and the amount thereof, so that after vinylation of the imide followed by polymerization homopolymers are obtained which are still soluble in polar solvents (alcohols, etc.) as well as all intermediate degrees of solubility between polar and non-polar solvents. Thus, homopolymers with a low degree of alkylation are still soluble in ethanol so that they can be formulated with "Freon" propellants to yield hair sprays whose sensitivity to moisture is considerably reduced. Homopolymers with a high degree of alkylation are soluble in aliphatic hydrocarbons, mineral and lube oils. In the latter case, they are useful as sludge dispersants and viscosity index improvers for lubricating oils. This is in sharp contrast to homopolymers prepared from non-alkylated N-vinyl imides which are insoluble in aliphatic hydrocarbons, mineral oils and lube oils.

The alkylated cyclic imides are especially useful for incorporation into polyalkylene plastics such as polyethylene, polypropylene and polybutene to improve the dye receptivity thereof either in sheet form, fiber or fabric.

The alkylated cyclic imides are also excellent starting materials for the preparation of m-nitro benzyl derivatives. In this preparation 1 mole of each of alkylated cyclic imide, formaldehyde or paraformaldehyde, and a substituted or unsubstituted nitrobenzene in which one of the meta position to the nitro group is unoccupied (e.g., p-nitrotoluene, p-chloronitrobenzene; 1.3-dimethyl-4-nitrobenzene, etc.) are condensed in the presence of sulfuric acid in accordance with the procedure outlined in U.S. 2,652,403. After reduction to the corresponding m-amino benzyl derivatives, there are obtained products which are valuable dye intermediates.

The alkylated cyclic imides in which the alkyl group contains from 8 to 42 carbon atoms are especially useful as ashless dispersants and rust inhibitors in a variety of engine and turbine oils.

Of particular interest is the 3-alkyl succinic anhydride which on reduction yields 3-alkyl-α-butyrolactone. The latter reacts with ammonia or primary aliphatic amines to give the corresponding 3-alkyl-2-pyrrolidone and N-substituted derivatives, respectively. With aliphatic diamines a 3-alkyl-N-aminoalkylpyrrolidone is obtained. With alkanolamines, such as ethanolamine, etc., a 3-alkyl-N-hydroxyalkyl pyrrolidone is obtained, which with thionyl chloride yields 3-alkyl-β-chloroalkyl pyrrolidone.

The alkyl cyclic anhydrides and the corresponding alkyl cyclic imides are very effective rust and corrosion inhibitors in turbine oils at low concentrations.

We claim:
1. The process of preparing alkylated cyclic anhydrides which comprises heating from 0.01 to 10 moles of an α-olefin selected from the class consisting of chloro-fluoro-α-olefin and fluoro-α-olefin of 2 carbon atoms and an α-olefin of from 2 to 100 carbon atoms with 1 mole of a cyclic anhydride having the following formula:

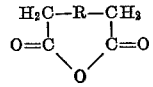

wherein R represents a member selected from the class consisting of a single bond joining the two methylene groups, and oxy and methylene group, at a temperature of from 100–200° C. in the presence of about 0.02 to about 0.3 mole of an organic peroxide per mole of said α-olefin.

2. The process of preparing alkylated succinic anhydride which comprises heating one mole of succinic anhydride with from 0.01 to 10 moles of an α-olefin selected from the class consisting of chloro-fluoro-α-olefin and fluoro-α-olefin of 2 carbon atoms and an α-olefin of from 2 to 100 carbon atoms, at a temperature of from 100–200° C. in the presence of about 0.02 to about 0.3 mole of an organic peroxide per mole of said α-olefin.

3. The process of preparing alkylated glutaric anhydride which comprises heating one mole of glutaric anhydride with from 0.01 to 10 moles of an α-olefin selected from the class consisting of chloro-fluoro-α-olefin and fluoro-α-olefin of 2 carbon atoms and an α-olefin of from 2 to 100 carbon atoms, at a temperature of from 100–200° C. in the presence of about 0.02 to about 0.3 mole of an organic peroxide per mole of said α-olefin.

4. The process of preparing alkylated diglycollic anhydride which comprises heating one mole of diglycollic anhydride with from 0.01 to 10 moles of an α-olefin selected from the class consisting of chloro-fluoro-α-olefin and fluoro-α-olefin of 2 carbon atoms and an α-olefin of from 2 to 100 carbon atoms, at a temperature of from 100–200° C. in the presence of about 0.02 to about 0.3 mole of an organic peroxide per mole of said α-olefin.

5. The process of preparing 3-decyl succinic anhydride which comprises heating one mole of succinic anhydride with 0.2 mole of α-decene at a temperature of 130°–140° C. in the presence of about 0.055 mole of di-t-butyl peroxide.

6. The process of preparing 3-dodecyl succinic anhydride which comprises heating one mole of succinic anhydride with 0.14 mole of α-dodecene at a temperature of 130°–145° C. in the presence of about 0.26 mole of t-butyl perbenzotae.

7. The process of preparing 3-hexadecyl glutaric anhydride which comprises heating one mole of glutaric anhydride with 0.125 mole of α-hexadecene at a temperature of 125°–145° C. in the presence of about 0.02 mole of di-t-amyl peroxide.

8. The process of preparing 3-decyl diglycollic anhydride which comprises heating one mole of diglycollic anhydride with 0.2 mole of α-decene at a temperature of 140–160° C. in the presence of about 0.0167 mole of 2.5-dimethyl-2,5-di(t-butyl peroxy)hexane.

9. The alkyl substituted cyclic anhydride of the formula:

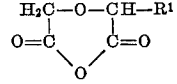

wherein R¹ represents an alkyl group of from 2 to 100 carbon atoms.

10. 3-decyl diglycollic anhydride having the following formula:

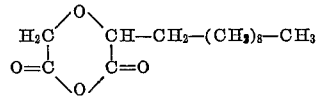

References Cited

UNITED STATES PATENTS 2,743,280  4/1956  Feasley et al. ____ 260—340.6 X
2,974,149  3/1961  Schmerling _____ 260—340.6

OTHER REFERENCES

Barry et al., Chemical Abstracts, vol. 41, 1947, cols. 4453–4454 (abstract of article taken from Proc. Roy. Irish Acad., vol. 51B, pp. 137–44 (1947)).

Roberts et al., Journal Chemical Society, 1950, pp. 2842–45.

ALEX MAZEL, Primary Examiner

JAMES H. TURNIPSEED, Assistant Examiner

U.S. Cl. X.R.

252—54.6, 390, 396; 260—88.3, 89.7, 297, 326.16, 333, 340.6, 345.9, 346.8; 424—47